United States Patent
Hsu

(10) Patent No.: US 6,450,748 B1
(45) Date of Patent: Sep. 17, 2002

(54) SCREW HAVING A SCREW THREAD FORMED WITH CONCAVE FACETS

(76) Inventor: Tai-Ping Hsu, No. 10, Chung-Lu, Chung-Lu Tsun, A-Lien Hsiang, Kaohsiung Hsien (TW)

( * ) Notice: Subject to any disclaimer, the term of this patent is extended or adjusted under 35 U.S.C. 154(b) by 0 days.

(21) Appl. No.: 09/801,942

(22) Filed: Mar. 8, 2001

(30) Foreign Application Priority Data

May 30, 2000 (TW) .................................. 89209202 U

(51) Int. Cl.$^7$ ................................................ F16B 25/10
(52) U.S. Cl. .................................... 411/387.4; 411/418
(58) Field of Search ........................ 411/411, 418–421, 411/311, 386, 387.1–387.4

(56) References Cited

U.S. PATENT DOCUMENTS

| | | | | |
|---|---|---|---|---|
| 3,238,836 A | * | 3/1966 | Johnson |
| 3,370,501 A | * | 2/1968 | Ansingh |
| 3,455,198 A | * | 7/1969 | Barrett |
| 5,044,853 A | * | 9/1991 | Dicke |
| 5,088,869 A | * | 2/1992 | Greenslade |
| 5,827,030 A | * | 10/1998 | Dicke |
| 6,056,491 A | * | 5/2000 | Hsu |
| 6,254,327 B1 | * | 7/2001 | Chen |
| 6,347,917 B1 | * | 2/2002 | Kato |

FOREIGN PATENT DOCUMENTS

| GB | 12651 | * 10/1885 |
|---|---|---|
| GB | 943575 | * 12/1963 |

* cited by examiner

Primary Examiner—Flemming Saether
(74) Attorney, Agent, or Firm—Cook, Alex, McFarron, Manzo, Cummings & Mehler, Ltd.

(57) ABSTRACT

A screw includes a shank portion and a head portion on one end of the shank portion. The shank portion has a continuous spiral screw thread with a plurality of turns formed thereon. The screw thread has an upper thread surface, a lower thread surface, and a cutting line that interconnects the upper and lower thread surfaces at a radial edge of the upper and lower thread surfaces distal to the shank portion. Each of at least some of the turns of the screw thread is formed with from two to six adjacent concave facets along the cutting line. Each of the concave facets has a radial width ranging from about 60 to 120 degrees. Each pair of the adjacent concave facets forms a pointed corner at the cutting line.

10 Claims, 5 Drawing Sheets

US 6,450,748 B1

SCREW HAVING A SCREW THREAD FORMED WITH CONCAVE FACETS

BACKGROUND OF THE INVENTION

1. Field of the Invention

The invention relates to a wood screw, more particularly to one having a screw thread formed with concave facets.

2. Description of the Related Art

A conventional wood screw includes a shank portion and a head portion on one end of said shank portion. The shank portion generally has a continuous spiral screw thread formed thereon. The screw thread has an upper thread surface, a lower thread surface, and a cutting line that interconnects the upper and the lower thread surfaces at a radial edge of the upper and lower thread surfaces distal to the shank portion. When the conventional wood screw is driven into a wooden board, wood shavings fill the grooves formed between adjacent screw thread sections on the shank portion as the screw thread cuts into the fibers of the wooden board, thereby resulting in a binding force between the screw and the wooden board. However, because the cutting line is in the form of a smooth spiral line, the cutting effect of the screw thread becomes duller as the depth of penetration of the conventional wood screw into the wooden board increases. In addition, the increased resistance can have an adverse affect on the required screw driving force and can result in possible damage to the screw.

It has been proposed heretofore to form the screw thread with densely and successively arranged grooves along the cutting line thereof. While the discontinuous screw thread as such provides additional space for receiving wood shavings as the screw thread cuts into the fibers of a wooden board, a much larger driving resistance is incurred, thereby resulting in a much larger driving force requirement and in possible damage to the screw.

SUMMARY OF THE INVENTION

Therefore, the main object of the present invention is to provide a wood screw that has a screw thread formed with concave facets so that the screw can be driven quickly into a wooden board while maintaining a relatively good binding force therewith.

According to the present invention, a wood screw includes a shank portion and a head portion on one end of the shank portion. The shank portion has a continuous spiral screw thread with a plurality of turns formed thereon. The screw thread has an upper thread surface, a lower thread surface, and a cutting line that interconnects the upper and lower thread surfaces at a radial edge of the upper and lower thread surfaces distal to the shank portion. Each of at least some of the turns of the screw thread is formed with from two to six adjacent concave facets along the cutting line. Each of the concave facets has a radial width ranging from about 60 to 120 degrees. Each pair of the adjacent concave facets forms a pointed corner at the cutting line.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
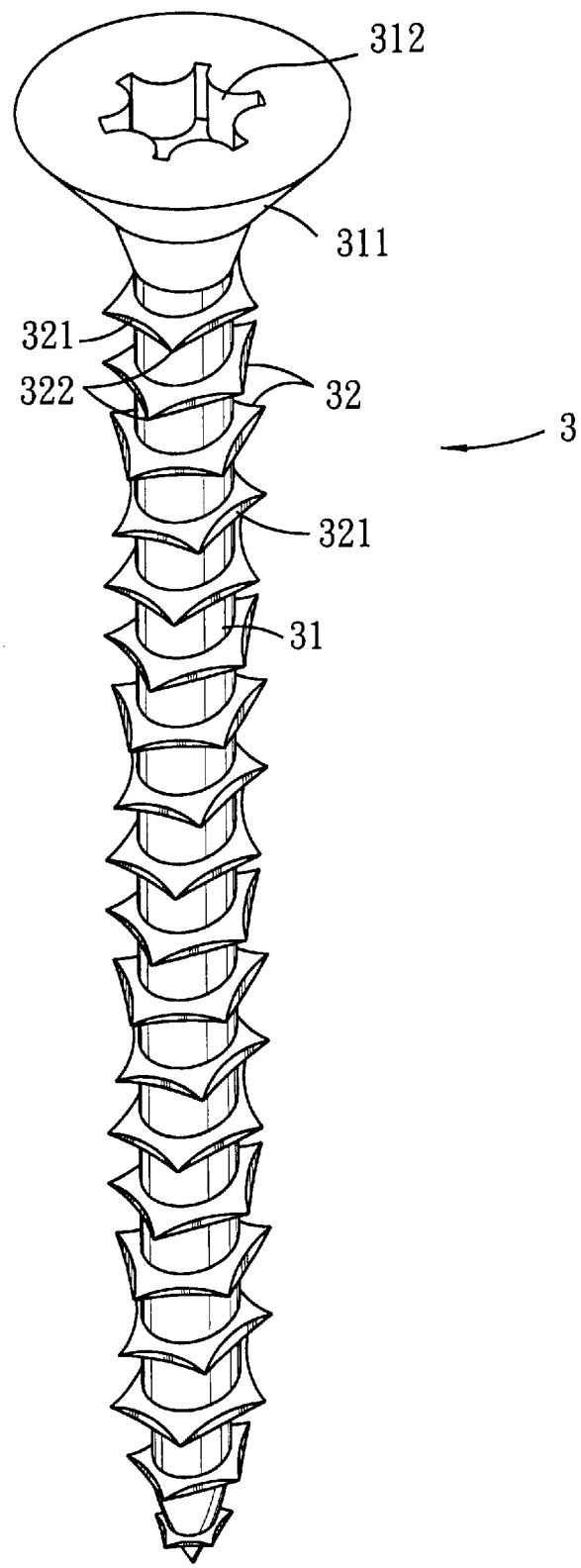
FIG. 1 is a perspective view of the first preferred embodiment of a wood screw according to the present invention.
Figure 2:
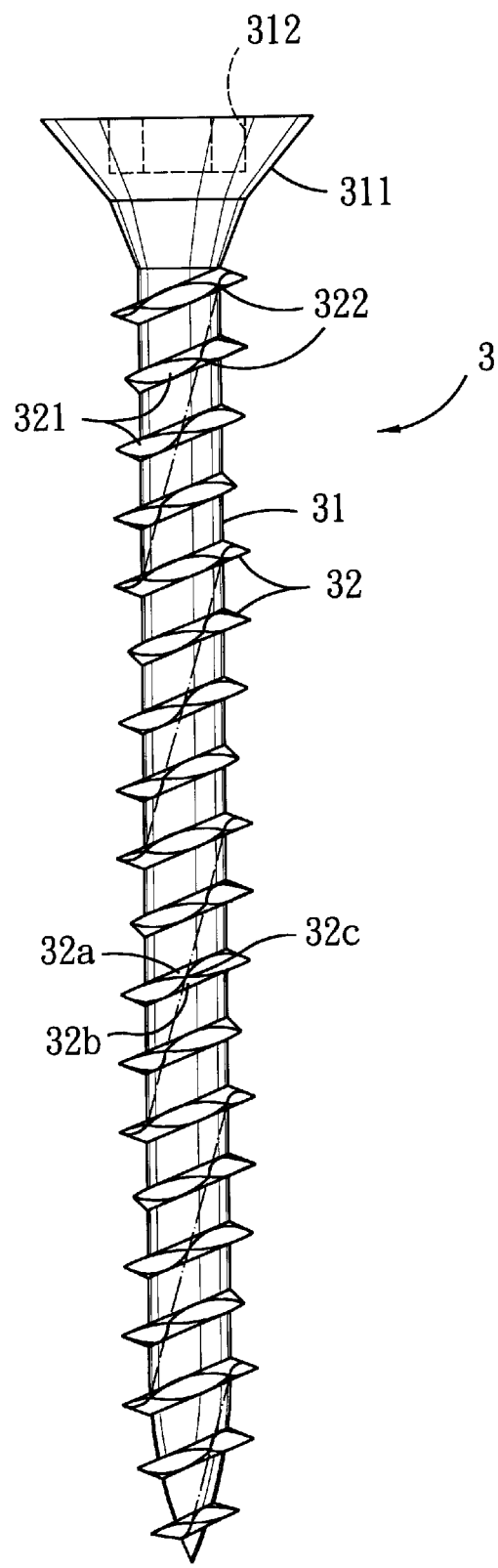
FIG. 2 is a schematic side view of the first preferred embodiment.
Figure 3:
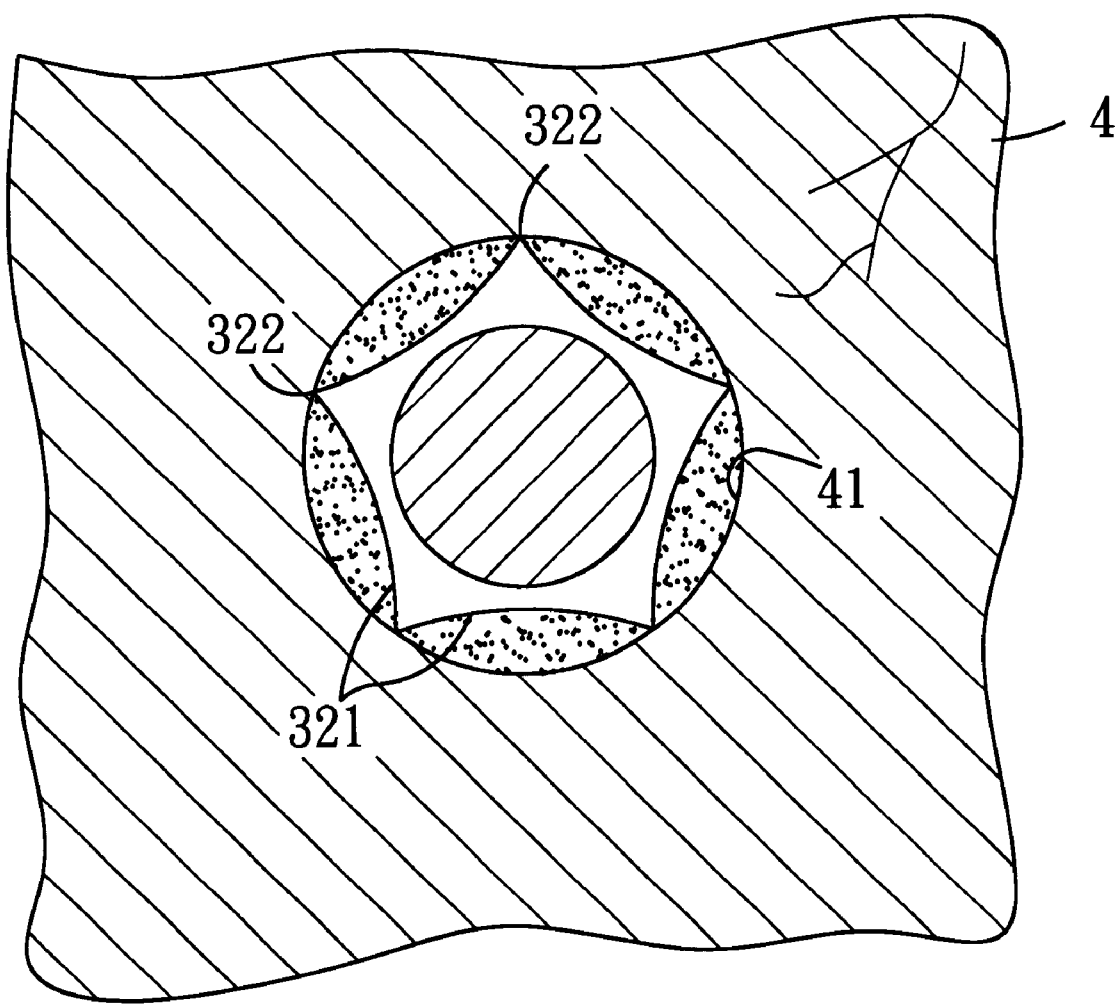
FIG. 3 is a cross-sectional view of the first preferred embodiment of a wood screw according to the present invention when driven into a wooden board.

Referring to FIGS. 1, 2 and 3, the first preferred embodiment of a wood screw 3 according to the present invention is shown to include a shank portion 31 and a head portion 311 on one end of the shank portion 31. The shank portion 31 has a continuous spiral screw thread 32 with a plurality of turns formed thereon. The screw thread 32 has an upper thread surface 32a, a lower thread surface 32b, and a cutting line 32c that interconnects the upper and the lower thread surfaces 32a, 32b at a radial edge of the upper and lower thread surfaces 32a, 32b distal to the shank portion 31.

Unlike the conventional wood screw described beforehand, each of at least some of the turns of the screw thread 32 of the screw 3 of this invention is formed with two to six adjacent concave facets 321 along the cutting line 32c. Each of the concave facets 321 has a radial width ranging from about 60 to 120 degrees. Each pair of the adjacent concave facets 321 forms a pointed corner 322 at the cutting line 32c.

In this embodiment, the concave facets 321 are formed successively along the turns of the screw thread 32. Each turn of the screw thread 32 is formed with five adjacent concave facets 321, each having a radial width of 72 degrees. In addition, upper ones of the pointed corners 322 on the screw thread 32 are aligned diagonally with corresponding lower ones of the pointed corners 322 with respect to an axis of the shank portion 31.

As the screw 3 is driven into a wooden board 4, the pointed corners 322 can cut into the fibers of the wooden board 4. In addition, the concave facets 321 can receive wood shavings 41 to ensure a relatively good binding force with the wooden board 4 without incurring a large increase in the driving force requirement. Furthermore, since the pointed corners 322 are not aligned along the axis of the shank portion 31, they can engage the wooden board 4 in succession as the screw 3 is driven into the latter, thereby minimizing possible damage to the screw thread 32.

If the turns of the screw thread 32 are each formed with only one concave facet 321, the advantage of a relatively good binding force without incurring a large increase in the driving force requirement cannot be achieved. If each concave facet 321 has a radial width less than 60 degrees, an undesirable increase in the screw driving resistance is observed. If the turns of the screw thread 32 are each formed with more than six concave facets 321, the cutting line of the screw thread 32 will be formed with densely arranged pointed corners 332 that will result in a much larger driving force requirement. If the radial width of each concave facet 321 is larger than 120 degrees, the strength of the screw thread 32 will be undesirably weakened.

Figure 4:
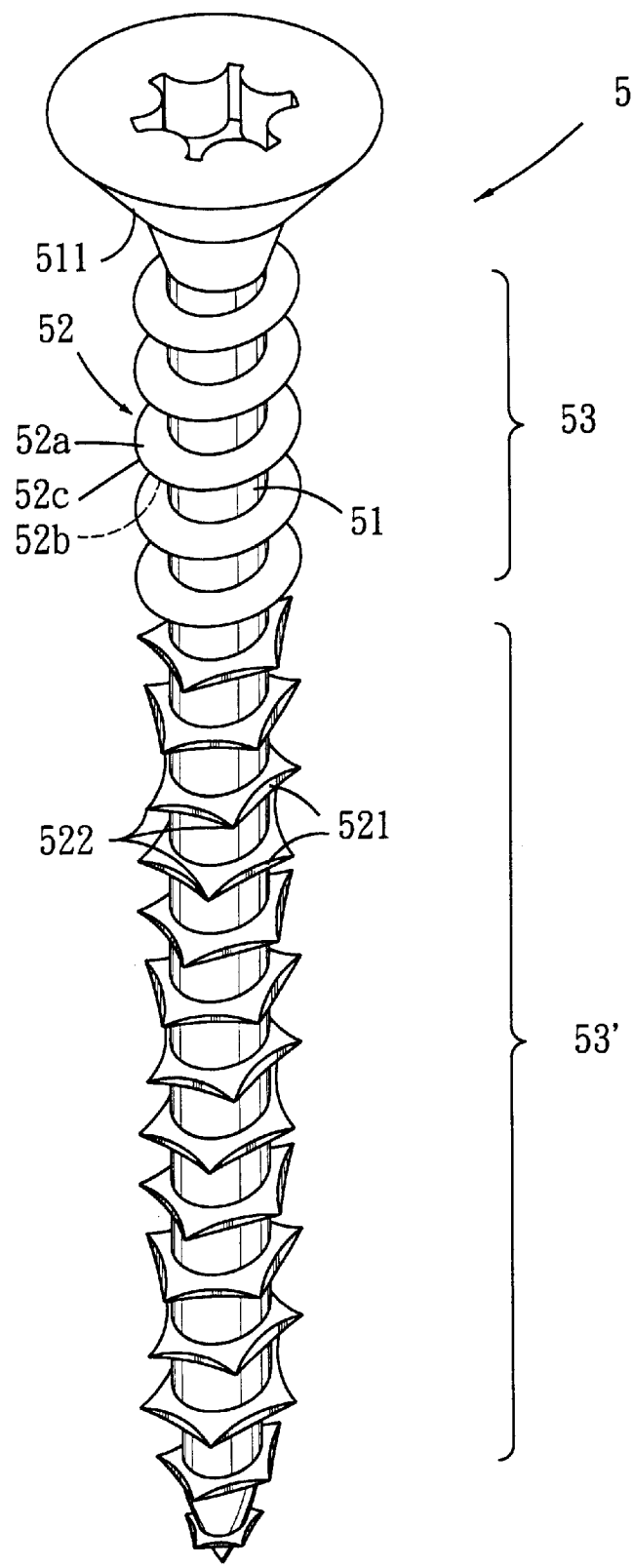
FIG. 4 is a perspective view of the second preferred embodiment of a wood screw according to the present invention.

Referring to FIG. 4, the second preferred embodiment of a wood screw 5 according to the present invention is shown to include a shank portion 51 and a head portion 511 on one end of the shank portion 51. The shank portion 51 has a continuous spiral screw thread 52 with a plurality of turns formed thereon. The screw thread 52 has an upper thread surface 52a, a lower thread surface 52b, and a cutting line 52c that interconnects the upper and lower thread surfaces 52a, 52b at a radial edge of the upper and lower thread surfaces 52a, 52b distal to the shank portion 51. The turns of the screw thread 52 include upper and lower ones 53, 53' disposed respectively on upper and lower parts of the shank portion 51. Adjacent concave facets 521, similar to those of the previous embodiment, are formed successively and solely on each of the lower ones 53' of the turns of the screw thread 52 along the cutting line 52c. Each pair of the adjacent concave facets 521 forms a pointed corner 522 at the cutting line 52c. Like the previous embodiment, upper ones of the pointed corners 522 on the screw thread 52 are aligned diagonally with corresponding lower ones of the pointed corners 522 with respect to an axis of the shank portion 51.

Because the upper ones 53 of the turns of the screw thread 52 are not formed with the concave facets 521, a larger contact area can be established between the screw thread 52 and the wooden board (not shown) once the upper part of the shank portion 51 has been driven into the wooden board to minimize axial deviation and wobbling of the screw 5.

Figure 5:
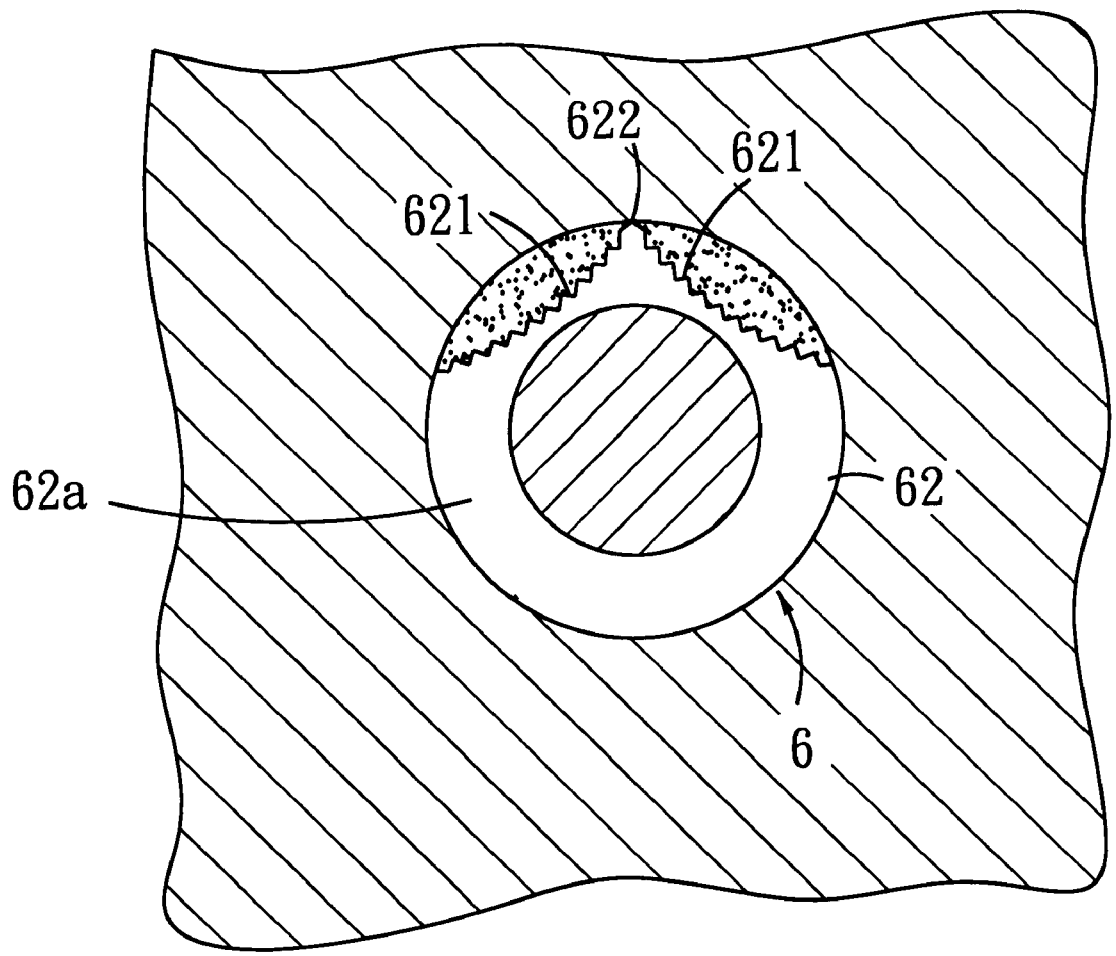
FIG. 5 is a cross-sectional view of the third preferred embodiment of a wood screw according to the present invention when driven into a wooden board.

Referring to the FIG. 5, the third preferred embodiment of a wood screw 6 according to the present invention is shown to be similar to the first preferred embodiment, except that each turn 62a of the screw thread 62 is formed with two adjacent concave facets 621 that form a pointed corner 622 therebetween. Each concave facet 621 has a radial width ranging from about 60 to 120 degrees, and a toothed surface such that the concave facets 621 are also capable of cutting into the fibers of a wooden board.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A screw comprising a shank portion, and a head portion and a tip portion on opposite ends of said shank portion, said shank portion having upper and lower shank parts and a continuous spiral screw thread that includes upper thread turns formed on said upper shank part and lower thread turns formed on said lower shank part, said screw thread having an upper thread surface, a lower thread surface, and a cutting line that interconnects said upper and lower thread surfaces at a radial edge of said upper and lower thread surfaces distal to said shank portion, each of said lower thread turns being formed with from three to six adjacent concave facets in succession along said cutting line, each of said concave facets having a radial width ranging from about 60 to 120 degrees such that adjacent concave facets in each of said lower thread turns cooperate to span the entire length of the respective one of said lower thread turns, each pair of said adjacent concave facets forming a pointed corner at said cutting line.

2. The screw of claim 1, wherein each of said concave facets has a toothed surface.

3. The screw of claim 1, wherein each of said upper thread turns is formed from three to six said adjacent concave facets in succession along said cutting line, said adjacent concave facets in each of said upper thread turns cooperating to span the entire length of the respective one of said upper thread turns.

4. The screw of claim 3, wherein the radial widths of said concave facets in each of said lower and upper thread turns are equal.

5. The screw of claim 4, wherein said pointed corners at said cutting line are aligned in diagonal lines with respect to an axis of said shank portion.

6. The screw of claim 4, wherein the number of said adjacent concave facets in each of said lower and upper thread turns is five.

7. The screw of claim 1, wherein each of said upper thread turns is free of said concave facets.

8. The screw of claim 7, wherein the radial widths of said concave facets in each of said lower thread turns are equal.

9. The screw of claim 8, wherein said pointed corners at said cutting line are aligned in diagonal lines with respect to an axis of said shank portion.

10. The screw of claim 8, wherein the number of said adjacent concave facets in each of said lower thread turns is five.

* * * * *